United States Patent [19]

Onuma et al.

[11] Patent Number: 4,806,949
[45] Date of Patent: Feb. 21, 1989

[54] MULTITONE THERMAL TRANSFER RECORDING METHOD AND APPARATUS

[75] Inventors: Akihiko Onuma, Hiratsuka; Iwao Fujii, Sagamihara, both of Japan

[73] Assignee: Minolta Camera Kabushiki Kaisha, Osaka, Japan

[21] Appl. No.: 111,252

[22] Filed: Oct. 22, 1987

[30] Foreign Application Priority Data

Oct. 24, 1986 [JP] Japan .................. 61-254447
Nov. 10, 1986 [JP] Japan .................. 61-268329

[51] Int. Cl.⁴ .............................. G01D 9/00
[52] U.S. Cl. .................. 346/76 PH; 358/298
[58] Field of Search ............ 346/76 PH, 1.1; 358/296, 298; 400/120

[56] References Cited
FOREIGN PATENT DOCUMENTS 0130379 10/1981 Japan ..................... 400/120
57-48868 3/1982 Japan .
57-57682 4/1982 Japan .
0205179 12/1982 Japan ..................... 400/120
59-38078 1/1984 Japan .

Primary Examiner—E. A. Goldberg
Assistant Examiner—Huan Hitran
Attorney, Agent, or Firm—Burns, Doane, Swecker & Mathis

[57] ABSTRACT

A thermal transfer recording technique for printing a multiple tone image by applying energy to a recording head for a period of time corresponding to digital tone data which represents the levels of tones as binary digits.

In this technique, a least significant digit of the digital tone data is output as a first signal and second signals are output repeatedly the number of times being equal to the digital tone data of binary form except the least significant digit data. The recording head is driven in response to the first and second signals so as to electrify the recording head for the unit time according to the first signal and for a period of twice as long as the unit time according to the second signal.

12 Claims, 14 Drawing Sheets

MULTITONE THERMAL TRANSFER RECORDING METHOD AND APPARATUS

BACKGROUND OF THE INVENTION (1) Field of the Invention

The present invention relates to a multitone thermal transfer recording method and apparatus for recording an multitone image represented by digital tone data by electrifying a heating element for a period in response to the level of tones in the data, and particularly to an improvement for reducing a period required for transferring the digital tone data to a shift register of a recording head and an improvement in the temperature compensating technique.

(2) Description of the Prior Art

When printing a multitone image, it is necessary to transfer digital tone data representing the level of tones of the image to the recording head. In a commonly practiced transfer method, the data are transferred the number of times corresponding to the number of tone levels by cycles of a unit electrification period as disclosed in Japansese Laid-Open patent application (kokai) 57-48868.

According to this transfer method, however, the data transfer takes a long time, and that in proportion to the number of tones. The long data transfer period is contrary to high speed printing since the thermal transfer recording apparatus will then be operable at a printing speed governed by the long transfer period.

A proposal has been made in Japansese Laid-Open patent application 57-57682 to reduce the data transfer period. The method disclosed in this publication is based on a basic principle of transferring digital tone data digit by-digit, whereby the times of data transfer are reduced and the data transfer period is shortened. In this method, however, the heating element is not electrified continuously though electrified for periods each corresponding to the number of tones. The heating element radiates heat during breaks in the electrification, and this results in a density reversal phenomenon among part of the data so that data having a large number of tones is printed with a less density than data having a small number of tones.

Further, temperature compensation is provided for conventional thermal printers in order to record image data with good tone reproduction. Such technique is at present known from Japansese Laid-Open patent applications 59-38078 and 57-205179.

According to the disclosure in Publication 59-38078, the recording head receives a strobe signal whose pulsewidth is variable with temperatures of the recording head. This technique has the problem that the data transfer period cannot be secured when the pulsewidth of the strobe signal becomes very small.

On the other hand, 57-205179 applies a chopped pulse signal to the heating element, and its pulse duty ratio is varied with head temperatures. This method realizes a constant strobe time, and therefore presents no trouble to the data transfer unlike the known method noted above. However, this technique gives no consideration to the chopping frequency. That is to say this technique is effective for compensating temperatures in printing black and white binary data, but leaves room for improvement to be fit for practical use as temperature compensating means where data having a large number of tones such as 32 tones, 64 tones and so on are printed.

SUMMARY OF THE INVENTION

A primary object of the present invention, therefore, is to provide a multitone thermal transfer recording method necessitating only a short period of data transfer to the recording head and capable of printing without causing the density reversal.

Another object of the present invention is to provide a useful thermal transfer recording apparatus for executing the above method in a rational manner.

A further object of the invention is to provide a multitone thermal transfer recording method which realizes effective temperature compensation.

A still further object of the invention is to provide a multitone thermal transfer recording apparatus including means for carrying out such temperature compensation.

The primary object of the invention is fulfilled by a thermal transfer recording method for printing a multiple tone image by applying energy to a recording head in synchronism with a strobe signal for a period of time corresponding to digital tone data which represent the levels of tones as binary digit, comprising the steps of outputting a least significant digit of the digital tone data as a first signal; outputting second signals repeatedly the number of times being equal to the digital tone data of binary form except the least significant data; and driving the recording head in response to said first and second signals so as to electrify the recording head for the unit time according to the first signal and for a period of twice as long as the unit time according to the second signal.

This method may realize effective temperature compensation by arranging that the strobe signal is interrupted in correspondence with a temperature of the recording head by the cycle of the unit electrification time.

In order to execute the above thermal transfer recording method in a rational manner, a recording apparatus provided according to the present invention comprises means for generating a least significant digit of the digital tone data as a first signal; means for generating second signals repeatedly the number of times being equal to the digital tone data of binary form except the least significant digit data; and means for driving the recording head in response to said first and second signals so as to electrify the recording head for the unit time according to the first signal and for a period of twice as long as the unit time according to the second signal.

The second signal generating means may include up counter means for outputting comparison data which is sequentially incremented by two, and comparing means for sequentially comparing the digital tone data of binary form except the least significant digit data with the comparison data and outputting the second signal when the digital tone data except the least significant digit data exceed the comparison data.

Instead of the above construction, the second signal generating means may include down counter means for outputting comparison data which is sequentially decremented from a preset value by two, and comparing means for sequentially comparing the digital tone data of binary form except the least significant digit data with the comparison data and outputting the second signal when the digital tone data except the least significant digit data exceed the comparison data.

Alternatively, the second signal generating means may comprise means for decrementing the digital tone data per se by data of two tone levels and outputting the second signal while the data are present.

In order to realize effective temperature compensation, this recording apparatus may further comprise a circuit for applying the strobe signal to the recording head, the circuit including judging means for taking in temperature information from a temperature sensor for detecting a temperature of the recording head during each unit electrification time, and for judging whether the electrification time has a proper duration or not, and chopping means for interrupting the strobe signal with a time width based on results of the judgment.

For promoting the temperature compensation effect, the judging means may include an up counter for counting up reference pulses, a comparator for comparing the count of the counter with a digital value of the temperature information provided by the temperature sensor, and means for controlling the chopping means to interrupt the strobe signal in response to comparison results. In a modified embodiment, the judging means includes a down counter for counting down reference pulses from a preset value, a comparator for comparing the count of the counter with a digital value of the temperature information provided by the temperature sensor, and means for controlling the chopping means to interrupt the strobe signal in response to comparison results. Further, the judging means may comprise means for decrementing the digital value of the temperature information received from the temperature sensor with each reference pulse, and controlling the chopping means to interrupt the strobe signal until the digital value becomes zero.

According to the present invention, the recording head is driven in response to the digital tone data which represent the level of tones of the image to be recorded by units of two tones (where the number of tones is an odd number, the one odd tone is printed on its own). Consequently, the times of data transfer and therefore the transfer period also are reduced.

The recording head is substantially driven by a continuous manner. This assures excellent printing with densities proportional to the number of tones in the data, without causing the density reversal.

Further, according to the present invention, temperature compensation is provided for the recording head by chopping the strobe signal. This is effective for maintaining a constant strobe width and avoiding trouble in the data transfer. The chopping of the strobe signal is effected with cycles of a unit electrification period, and the strobe signal is cut for a time proportional to a recording head temperature. As a result, a uniform temperature compensating effect is produced over all levels from lowest tone to highest tone.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DETAILED DESCRIPTION OF THE INVENTION

Figure 1:
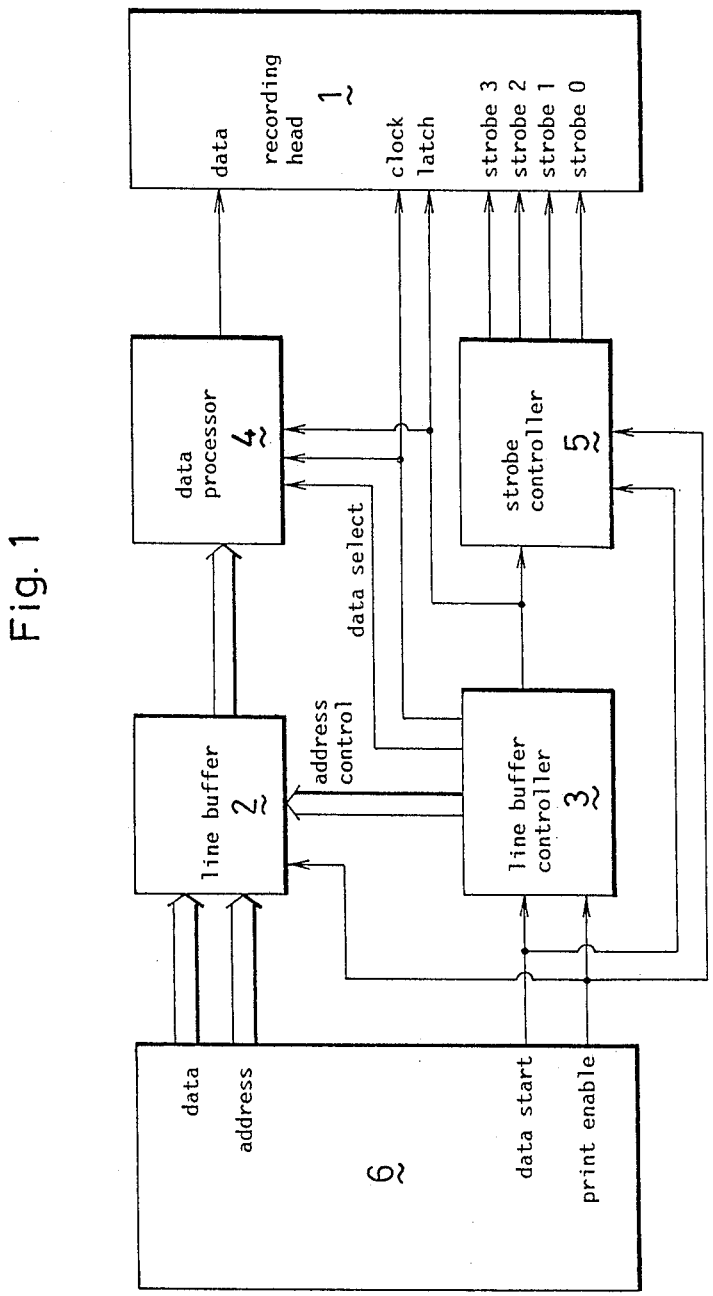
FIG. 1 is a block diagram of a multitone thermal transfer apparatus according to the present invention.

FIG. 1 is an overall block diagram of one embodiment of the present invention. A recording head 1 includes a heating element, a drive element, a latch for holding data corresponding to one line, and a shift register. The recording head 1 receives data, clocks, a latch signal and four strobe signals. The data are input to the shift register in synchronism with the clocks and latched in response to the latch signal. The strobe signal causes the heating element to be heated for a period of time corresponding to the number of tones in the data. In this embodiment, the recording head 1 includes heating elements of 6 dots/mm and 1280 dots in total. The heating elements are divided into four parts, and the strobe signal is applied to each part or division. In FIG. 1, the recording head 1 is shown to receive strobes 0 to 3, which correspond to the number of divisions of the head.

Figure 8:
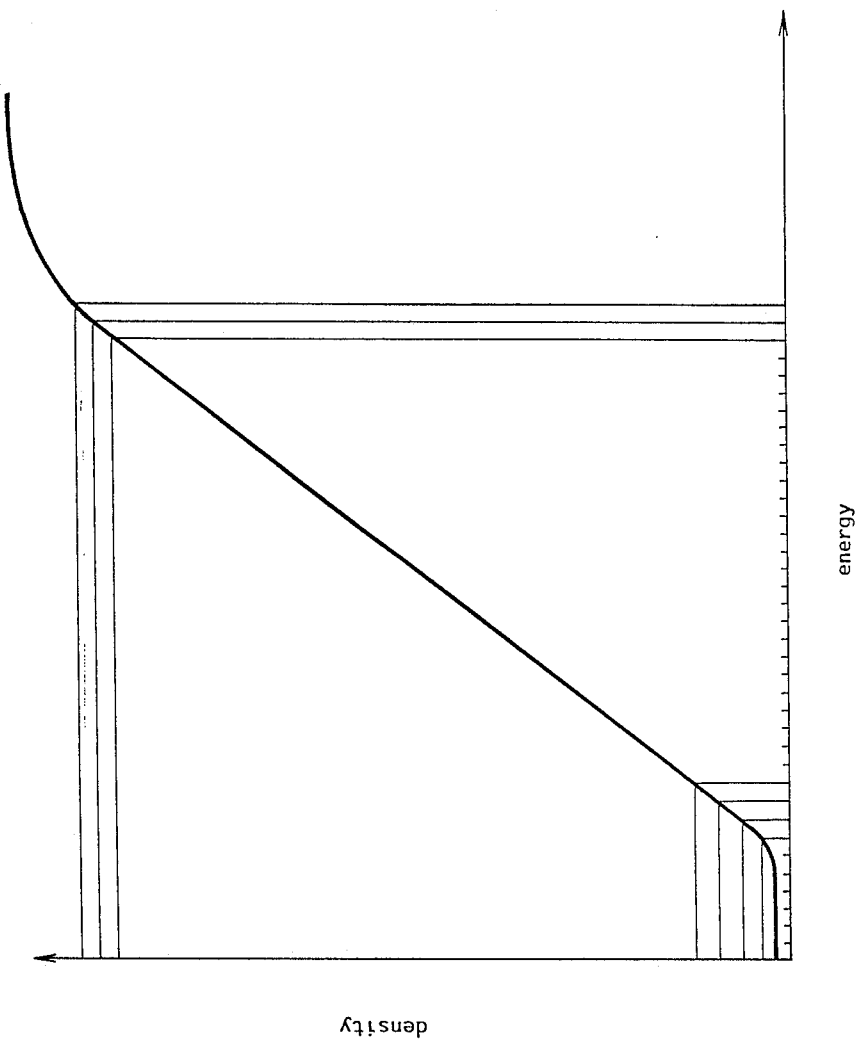
FIG. 8 is a view showing density characteristics of a recording material.

A line buffer 2 comprises a memory for storing the data corresponding to one line, and a multiplexer for switching address, data and control signals. The multiplexer selects either the address, data and control signals received from a printer control unit 6 or the address and control signals received from a buffer control unit 3, and outputs a data signal to a data processing unit 4. The data input to the line buffer 2 from the unit 6 are digital tone data to be recorded which are processed beforehand into the number of tones suited to density characteristics of a recording material. More particularly, where, for example, linear 32-tone recording is to be carried out and the recording material has such density characteristics that require energy corresponding to six tones for a density rising as shown in FIG. 8, the tone data l is derived from the following equation:

$$l = \begin{bmatrix} 0 (n = 0) \\ n + 6 (1 \leq n \leq 31) \end{bmatrix}$$

wherein n is the number of tones in an image data (which is an unprocessed data having no relevance to the density characteristics of the recording material). Thus, the image based on the data =0, 7, 8 to 37 is recorded. The line buffer 2 receives a print enable signal also. This signal indicates that one line is being printed, and one line paper feed is effected when this signal is in a disable state. The multiplexer takes a switching action in response to the print enable signal applied to the line buffer 2. The data corresponding to one line is written to the line buffer 2 from the printer control unit 6 during a disable period of the print enable signal, and the data is output to the data processing unit 4 during an enable period thereof in accordance with the control signal from the line buffer control unit 3.

The line buffer control unit 3 receives a data start signal and the print enable signal from the printer control unit 6, and produces the address, data select and latch signals for the line buffer 2 with a predetermined timing. The line buffer control unit 3 includes an oscillator for generating the clocks. Address renewals are effected in response to these clocks. The data start signal is a signal for setting a timing for data transfer to the recording head 1, and the latch signal is produced from this signal also.

The data processing unit 4 receives the data select, latch and clock signals from the line buffer control unit 3, and the data from the line buffer 2.

A strobe control unit 5 produces the four strobe signals from the print enable signal, latch signal and data start signal and outputs the strobe signals to the recording head 1. Circuit constructions of this strobe control unit 5, the line buffer control unit 3 and data processing unit 4 will be described in detail later.

Figure 2:
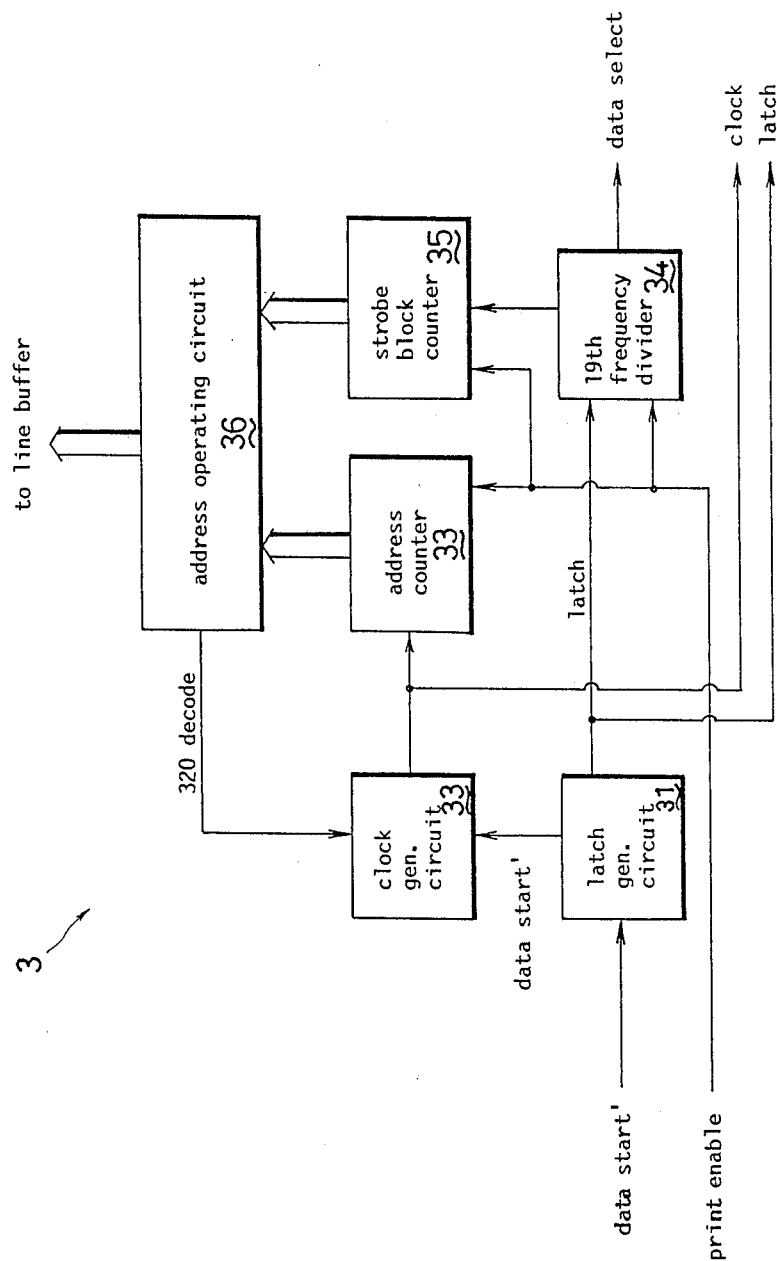
FIGS. 2 through 4 are diagrams showing details of circuit constructions of some blocks shown in FIG. 1.
Figure 6:
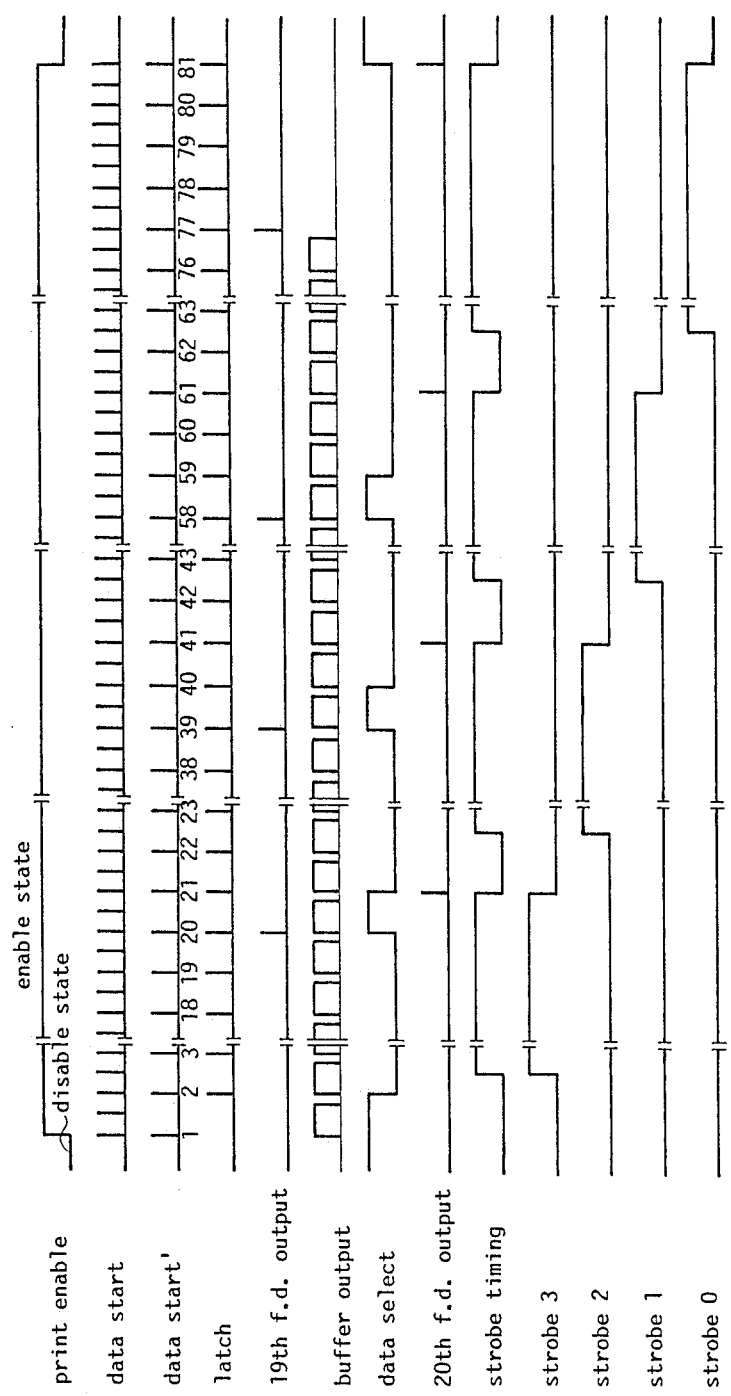
FIGS. 6 and 7 are time charts for illustrating operations of the recording apparatus.

FIG. 2 shows details of the circuit construction of line buffer control unit 3. The line buffer control unit 3 in this example comprises a latch generating circuit 31, a clock generating circuit 32, an address counter 33, a one-19th frequency dividing circuit 34, a strobe block counter 35 and an address operating circuit 36. The latch generating circuit 31 receives the data start signal, and produces a modified data start signal by deleting even pulses from the data start signal and a latch signal by deleting the first pulse from the data start signal. The modified data start signal and latch signal have waveforms as shown in FIG. 6. The clock generating circuit 32 generates 4MHz clocks upon receipt of the modified data start signal and transmits the clocks to the address counter 33, data processing unit 4 and recording head 1. The address counter 33 is incremented by these clocks. In course of time as the address counter 33 is incremented, the address operating circuit 36 generates a 320 decode signal to cause the clock generating circuit 32 to stop generating the clocks. As a result, the address counter 33 is reset to wait till a next modified data start signal is input to the clock generating circuit 32. Thus, the address counter 33 generates 0 to 319 addresses in synchronism with the clocks after the modified data start signal is input, and applies the addresses to the address operating circuit 36. The one-19th frequency dividing circuit 34 counts the latch signal produced by deleting the first pulse from the data start signal, generates a pulse at every nineteenth latch signal, and transmits the pulses thus generated to the strobe block counter 35. The pulses output by the one-19th frequency dividing circuit 34 is shown in FIG. 6 as one-19th frequency divider output. The strobe block counter 35 is a down counter decremented by one with every 19th latch. The address operating circuit 36 carries out an operation (count of the address counter)+(count of the strobe block counter)×320, and outputs the result to the line buffer 2 as the address signal. Thus, the address signal output as the addresses of the line buffer 2 corresponds to 19 times output of 960 to 1279, 19 times output of 640 to 959, 19 times output of 320 to 639 and 19 times output of 0-319 provided in the mentioned order with every input of the print enable signal and modified data start signal. In other words, the address signal corresponds to 960 to 1279, 640 to 959, 320 to 639 and 0 to 319 address values output 19 times at 1 to 19, 20 to 38, 39 to 57 and 58 to 76 of the modified data start signal, respectively, which is shown in FIG. 6 as data start' (with a prime), and the data corresponding to the respective addresses are read out of the line buffer 2 and input to the data processing unit 4. That the line buffer control unit 3 repeatedly outputs the same address value 19 times is related to the feature of the present invention that the data of a maximum of 37 tones are transferred to the recording head 1 two tones at a time.

The data select signal is a signal output when the counter of 19th frequency dividing circuit 34 is zero (i.e. reset) and applied to the data processing unit 4.

Each of the circuits 31 to 36 of line buffer control unit 3 carries out the described operation when the print enable signal is in the enable state. When the print enable signal is in the disable state, the address counter 33 and 19th frequency dividing circuit 34 are reset, and the strobe block counter 35 is preset to "3".

Figure 3:
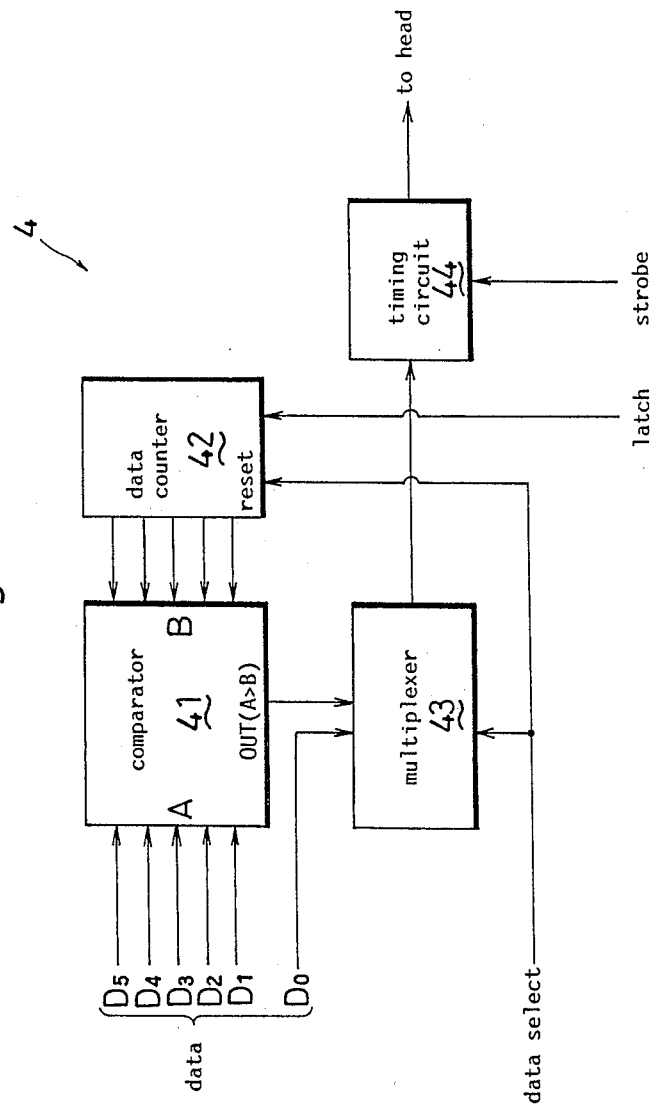

FIG. 3 shows details of the circuit construction of data processing unit 4. The data processing unit 4 comprises a comparator 41, a comparison data counter 42, a multiplexer 43 and a timing circuit 44. The comparator 41 compares data A comprising 6-bit digital tone data D0 to D5 received from the line buffer 2, from which data the least significant digit data D0 is excluded, with a count data B received from the comparison data counter 42, and transmits results of the comparison to the multiplexer 43 when the data A is greater than the count B. The least significant digit data D0 is excluded as noted above, and therefore data D1 constitutes the least significant digit data in the digital tone data to be compared at the comparator 41. The number of data compared at the comparator 41 is eighteen where the tone data include a total of 37 tones.

The comparison data counter 42 counts up the latch signal transmitted from the line buffer control unit 3. This counter 42 is reset when the data select signal becomes "H" state.

The multiplexer 43 takes in the least significant digit data D0 of the digital tone data D0 to D5 and outputs it to the timing circuit 44 when the data select signal is in "H" state. In addition to the function to pick out the least significant digit data, the multiplexer 43 is switchable by the data select signal to accept the comparison results from comparator 41 and transfers them to the timing circuit 44 when the data select signal is in "L" state.

The timing circuit 44 transfers the output signal of the multiplexer 43 to the recording head 1 as timed with the clocks.

The data processing at the data processing unit 4 is carried out in two ways in accordance with the data select signal. When the data select signal is in "H" state, the multiplexer 43 outputs the least significant digit data D0 as it is. This corresponds to the first cycle in the data readout effected times by repeatedly designating 19 times a selected address section of the line buffer 2 in response to the address signal produced by the line buffer control unit 3. During the second to nineteenth data readout cycles, the multiplexer 43 is switched to output the comparison results of the comparator 41. At this time the value of the comparison data counter 42 is incremented by the latch signal in synchronism with the data readout. Since the output of comparison data counter 42 is zero at the time of second data readout, the comparator 41 outputs the comparison results if the tone data D1-D5 read out of the line buffer 2 are equal to or exceed one. Thereafter the value of the comparison data counter 42 is incremented up to the time of nineteenth readout, the data count is compared with the tone data D1 to D5 each time, and the comparison results are output when the tone data D1 to D5 are greater than the data count. The data count of comparison data counter 42 is "17" at the time of nineteenth data readout. Therefore the comparison results are output if the tone data D1 to D5 are "18" at this time. Since the tone data D1 to D5 do not include the least significant digit data D0, the tone data at the value of 18 means that actual tone data including the least significant digit data D0 have 37 or 38 tones.

Figure 4:
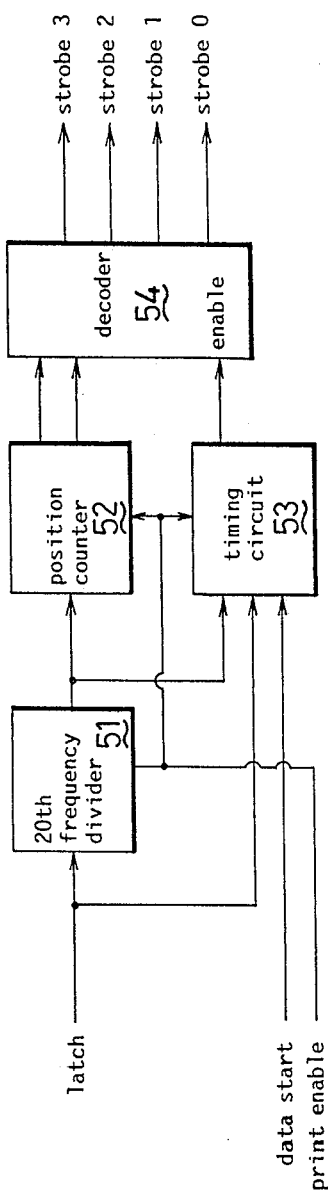

FIG. 4 shows details of the circuit construction of strobe control unit 5. The strobe control unit 5 functions to drive the recording head 1 at a proper position for a proper voltage application time with respect to the data input to the recording head 1 and, in this example, comprises a one-20th frequency dividing circuit 51, a strobe position counter 52, a strobe timing circuit 53 and a decoder 54.

The one-20th frequency dividing circuit 51 counts the latch signal, and outputs a pulse and is reset at the same time when the count reaches twenty. The strobe position counter 52 counts up the pulses output from the one-20th frequency dividing circuit 51, and inputs the count to the decoder 54. The strobe timing circuit 53 is reset by the output of the one-20th frequency dividing circuit 51 when the print enable signal is in the disable state, and is-set when in the reset state the latch signal and data start signal are input of the circuits. The decoder 54 is enabled by a strobe timing signal output from the strobe timing circuit 53, to produce the strobe signals 3 to 0 in response to the output of strobe position counter 52. The strobe signals 3 to 0, the output of one-20th frequency dividing circuit 51, and the strobe timing signal are shown in the time chart of FIG. 6.

Figure 5:
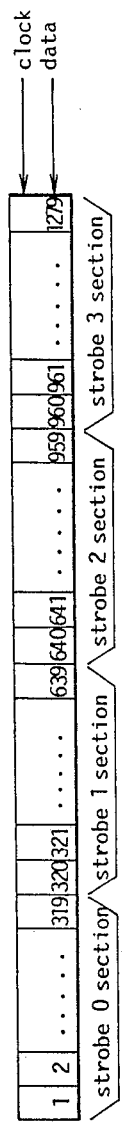
FIG. 5 is a view of a shift register mounted in a recording head.

Upon receipt of the data from the timing circuit 44 of data processing unit 4, the strobe signals 3 to 0, the latch signal, and the clocks, the recording head 1 has a selected division thereof driven for a period of time corresponding to the number of tones in the data. How the recording head 1 is driven at a proper position will be described with reference to FIG. 5 diagrammatically showing the shift register of head 1. Each time the data start signal is generated, the data signal output from the timing circuit 44 is input to the recording head 1 in an amount corresponding to 320 dots, which is latched and then used for driving the head 1. The strobe 3 section (which corresponds to a division of 960 to 1279 heating element dots) is the closest to an input end of the shift register, and therefore the input data may be printed immediately without any lag in print timing with respect to the data. In the case of the strobe 2 section (which corresponds to a division of 640 to 959 heating element dots), however, the data remain in the strobe 3 section at the latch immediately following the data input and the data reach the strobe 2 section only with a latch after another data input period. It is, therefore, necessary to print the data with a lag corresponding to one latch. Similarly, the print timing for the strobe 1 section (which corresponds to a division of 320 to 639 heating element dots) involves a lag corresponding to two latches, and that for the strobe 0 section (which corresponds to a division of 1 to 319 heating element dots) involves a lag corresponding to three latches. These lags are compensated for by timing adjustments of the strobe signals effected at the strobe control unit 5. This operation will now be described with reference to the time chart of FIG. 6. The data signal transferred from the data processing unit 4 to the recording head 1 during the period of the first to nineteenth of the modified data start signal is latched at times of second to twentieth modified data start signal inputs. When one data start signal is generated after the first latching of the data signal, the signal of strobe 3 is applied to the recording head 1 until the 21st modified data start signal is generated. Consequently, the heating element effects printing with 960th to 1279th dots in accordance with the above data signal. Next, the data signal transferred to the recording head 1 during the period of the 20th to 38th of the modified data start signal is latched at times of 22nd to 40th modified data start signal inputs, with a lag corresponding to one modified data start signal input (at which times the data signal reaches the section of strobe 2). When one data start signal is generated after the first latching, the signal of strobe 2 is applied to the recording head 1 to effect printing with 640th to 959th dots. Further, the data signal transferred during the period of the 39th to 57th of the modified data start signal is latched at times of 42nd to 60th modified data start signal inputs, with a lag corresponding to two modified data start signal inputs. The data signal transferred during the period of the 58th to 76th of the modified data start signal is latched at times of 62nd to 80th modified data start signal inputs, with a lag corresponding to three modified data start signal inputs. In either case, when one data start signal is generated after the latching, the signal of strobe 1 or 0 is applied to the recording head 1 to effect printing with 320th to 639th dots or 1st to 319th dots. The data signal used for printing with each heating element dot form a pulse having a pulsewidth corresponding to the number of digital tones.

Figure 7:
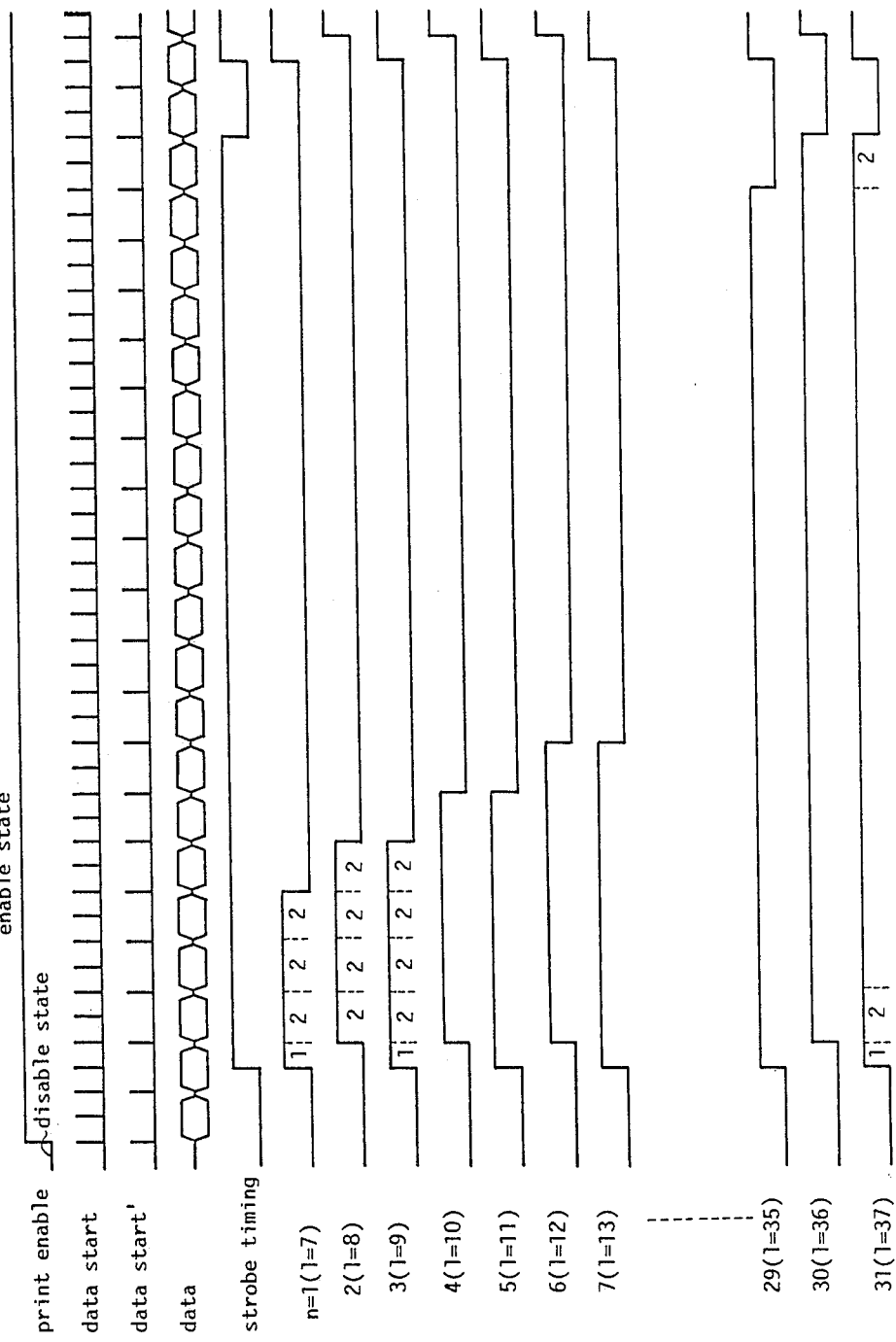

FIG. 7 shows waveforms of the data signal corresponding to the tones (n=1 to 31). As seen, when number of tones in the digital tone data to be recorded is an odd number, the least significant digit data D0 (corresponding to one tone) is first latched at the time of the second modified data start signal and is applied for a time corresponding to one cycle of the data start signal (a unit electrification time). Thereafter, the data transferred in two-tone units are latched with the second and subsequent modified data start signals and are continuously applied during cycles of the modified data start signal each of which corresponds to twice the unit electrification time. On the other hand, when number of tones in the digital tone data to be recorded is an even number, no tone data are latched with the second data start signal since the least significant digit data is zero, and the data transferred in two-tone units are latched with the third and subsequent modified data start signals and are continuously applied during the cycles of the modified data start signal each corresponding to twice the unit electrification time. In FIG. 7, numerals "1" and "2" marked in sections defined by broken lines in the data signal waveforms 1=7, 8 and 9 represent the numbers of tones in the data transferred to the head 1. In all of the waveforms 1=7 to 37 the data signal is continuous throughout with no break. Consequently, the heating element is electrified continuously to effect printing with a density proportional to number of tones. Since the data are transferred to the recording head 1 in two-tone units, the number of times of the data transfer is about half of that in the known system which transfers the data tone by tone. For example, the number of times of the data transfer is nineteen where 37 tone data are printed. The reduced number of transfer times increases the printing speed so much.

Figure 9:
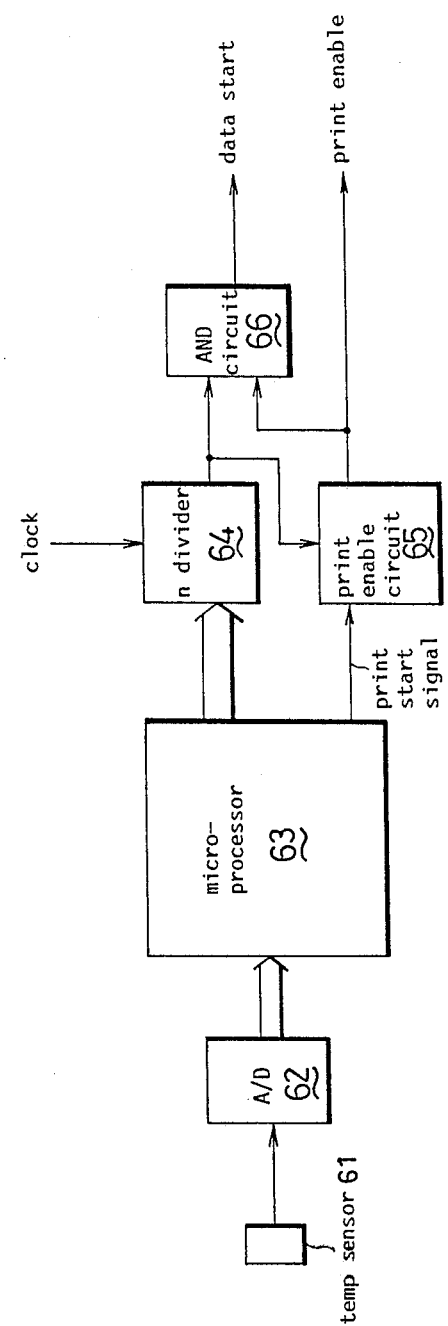
FIG. 9 is a view of a circuit for providing temperature compensation at a printer control section.

FIG. 9 shows a temperature compensating circuit used with the printer control unit 6. The circuit of FIG. 9 varies the clock dividing ratio n in accordance with a temperature signal in order to vary the cycle of the data start signal. More particularly, a temperature signal derived from a temperature sensor 61 such as a thermister is digitalized by an A/D converter 62 and then input to a microprocessor 63. The microprocessor 63 determines an appropriate frequency dividing ratio n on the basis of the temperature signal to vary the frequency dividing ratio n for the clock frequency divider 64. The data start signal is derived as the logical sum of the frequency divided clocks and the print enable signal obtained from a print enable circuit 65. Consequently, the cycle is varied by varying the clock frequency dividing ratio n, thereby effecting temperature compensation for the recording head 1. The clock frequency dividing ratio n may be suitably selected within a range of n being greater than 160 when the clocks have a 4 MHz frequency.

Figure 10:
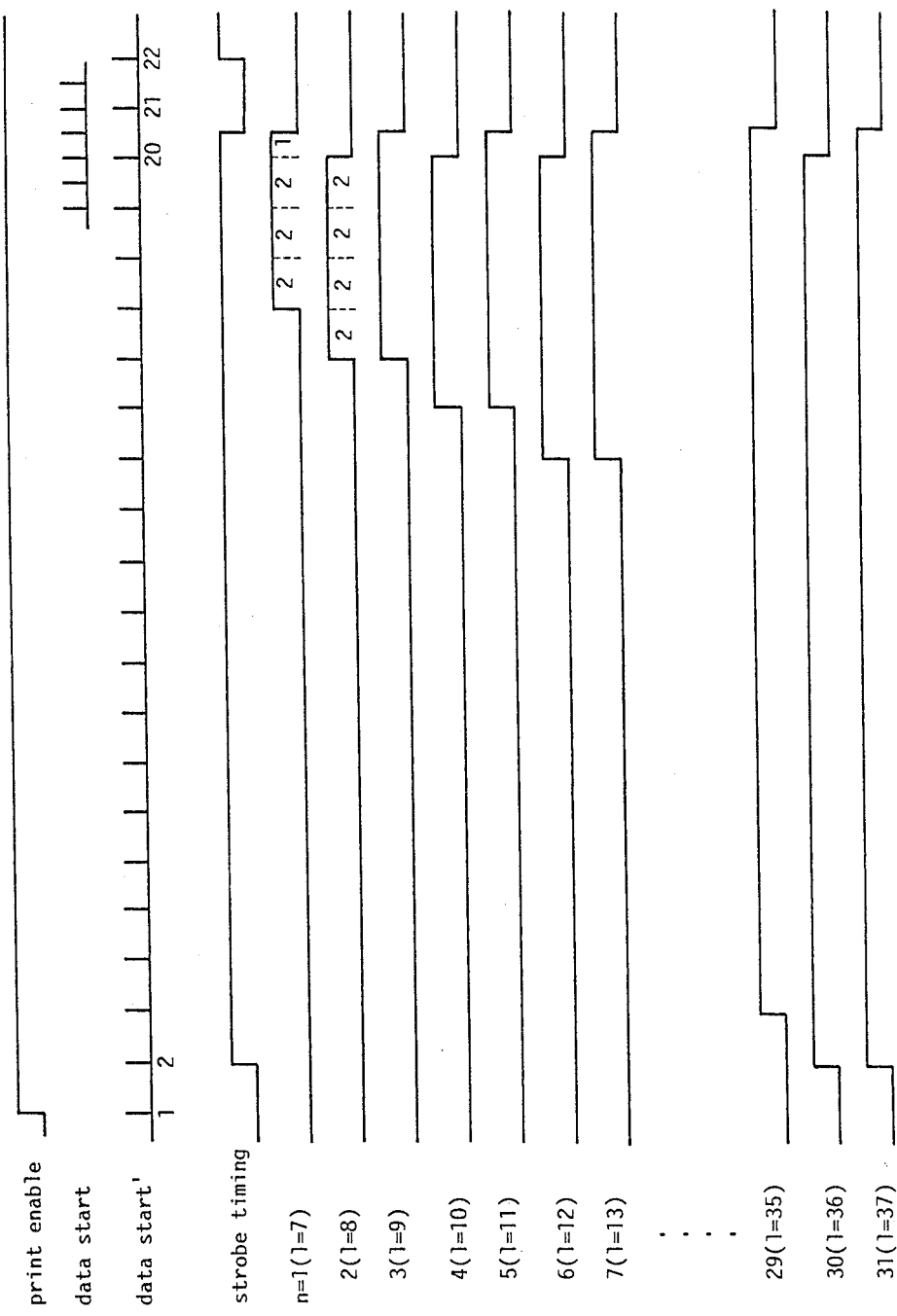
FIG. 10 is a view illustrating a data readout operation when a comparison data counter is decremented.

The comparison data counter 42 comprises an up counter in the above embodiment, but it may of course comprise a down counter. In the latter case, the counter 42 is connected such that the counter 42 is preset to "17" when the data select signal is low (i.e. is not output), and is decremented by the latch signal when the data select signal is high (i.e. is output). In this instance the data takeout means is operable as follows:

As in the case of the comparison data down counter 42 comprising an up counter, the comparator 41 outputs the comparison results only when the tone data D1–D5 exceed the count. However, the comparison data compared at the comparator 41 with the tone data to be recorded is seventeen at the first time and zero at the eighteenth time. At the nineteenth time, data D0 is output as it is since the data select signal is low. FIG. 10 shows a time chart for illustrating takeout timings of the tone data n=1 to 31. In this time chart, the strobe signal is reset when the print enable signal is in the disable state and when the 19 decode signal is output from the counter of the 20th frequency dividing circuit and the data start signal is input, and is set when the counter of the 20th frequency dividing circuit shows count one.

Instead of the foregoing embodiment which comprises the comparator 41, comparison data counter 42, and multiplexer 43, the invention may be practiced such that the tone data per se are decremented by every unit of two tones to take out only the least significant digit data remaining in the end.

Figure 11:
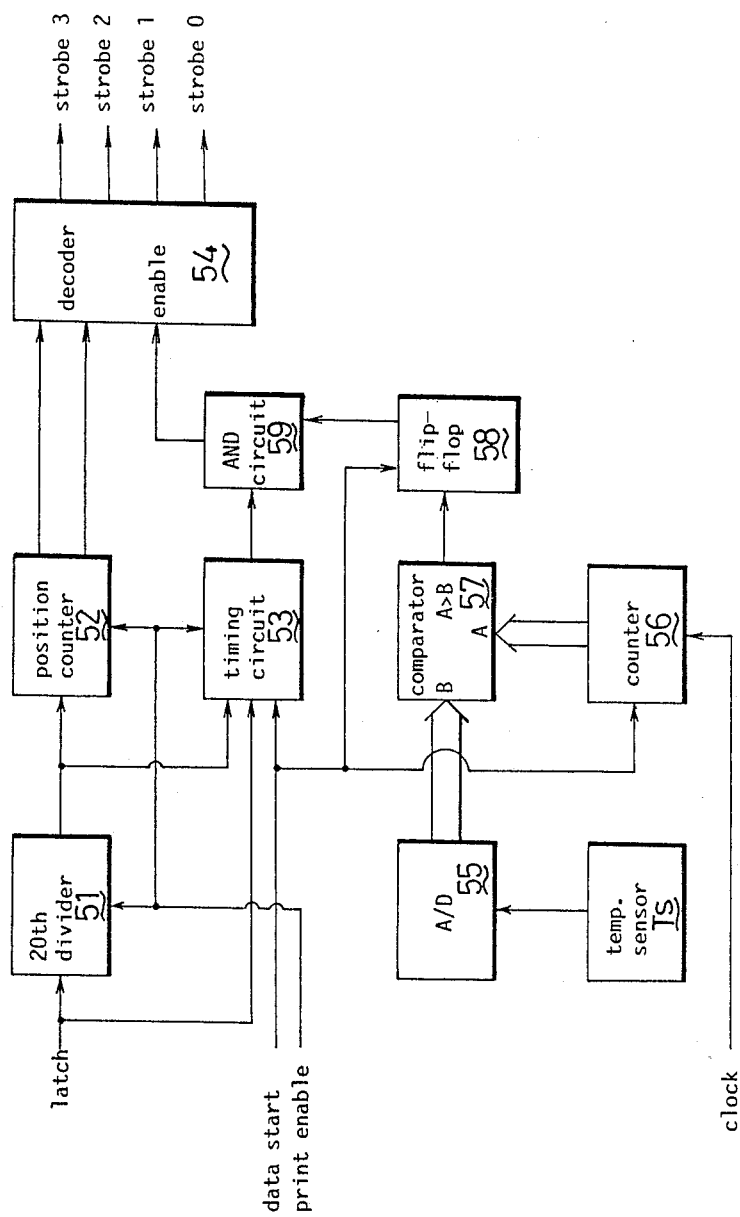
FIG. 11 is a circuit diagram of a strobe control section including a temperature circuit.

FIG. 11 shows a strobe control unit including a temperature compensating circuit. The circuits of this control unit referenced 51 to 54 are the circuits for producing the strobe signals as described with reference to FIG. 4, and the circuits 55 to 59 are circuits for effecting temperature compensation. Accordingly, the circuits 55 to 59 will be described hereinafter since the circuits 51 to 54 have already been described.

Figure 12:
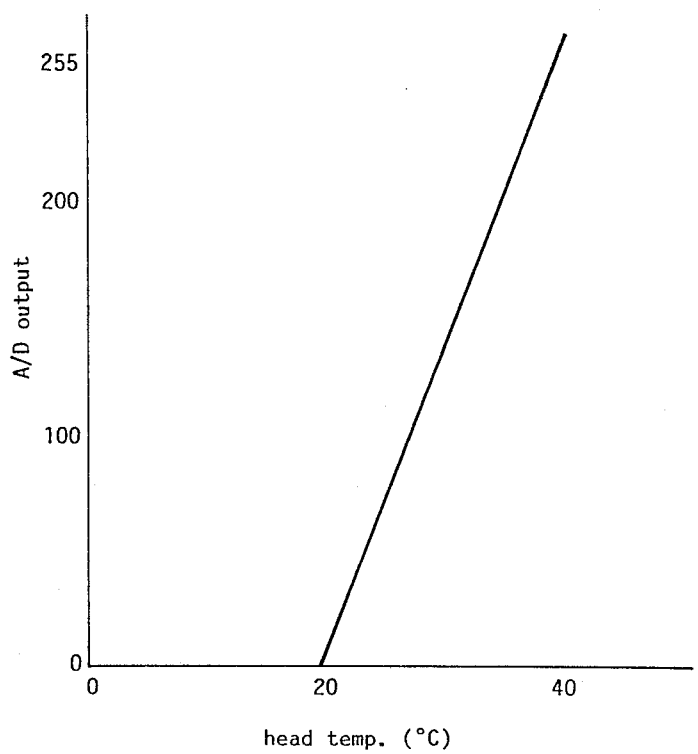
FIG. 12 is a view showing a relationship between input and output of an A/D converter for converting temperature data received from a temperature sensor into a digital signal.
Figure 13:
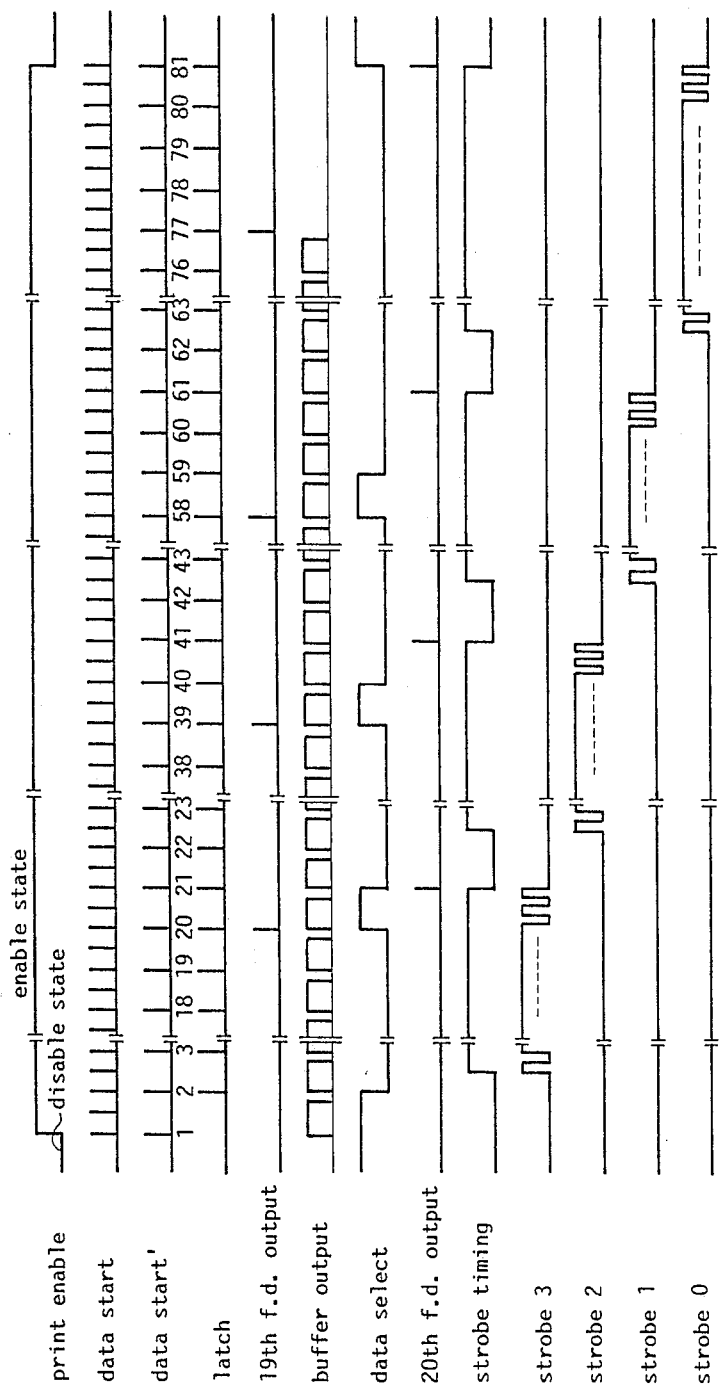
FIGS. 13 and 14 are views showing chopped strobe signals.

An A/D converter 55 converts temperature information received from a temperature sensor Ts for detecting the temperature of the recording head 1 into a digital signal, and transmits it to a comparator 57. In this embodiment, as shown in FIG. 12, the output of temperature sensor Ts is divided into 256 equal parts when the head temperature is from 20° to 40° C., and is output to the comparator 57 as converted into 8-bit digital values of 0 to 255. A counter 56 is reset every time by the data start signal, counts up reference pulses until it is reset by a next data start signal, and outputs the count as an 8-bit digital value. The reference pulses may comprise the clocks generated by the clock generating circuit 32 of the line buffer control unit 3, for example. The comparator 57 compares temperature information B received from the A/D converter 55 with the count A received from the counter 56, and outputs comparison results when the count B exceeds the temperature information. The comparison results are applied to a clock terminal of a flip-flop 58. The flip-flop 58 is reset every time by the data start signal, and provides a high level output when set by the comparison results and a low level output when reset. An AND circuit 59 opens its gate when the flip-flop 58 provides the high level output and closes the gate when the flip-flop 58 provides the low level output. The strobe timing signal is chopped by the gate opening and closing of the AND circuit 59. As a result of such chopping, the strobe signals 0 to 3 output from the decoder 54 have waveforms as shown in FIG. 13. The waveforms of the other signals shown in FIG. 13 are the same as those shown in FIG. 6.

Figure 14:
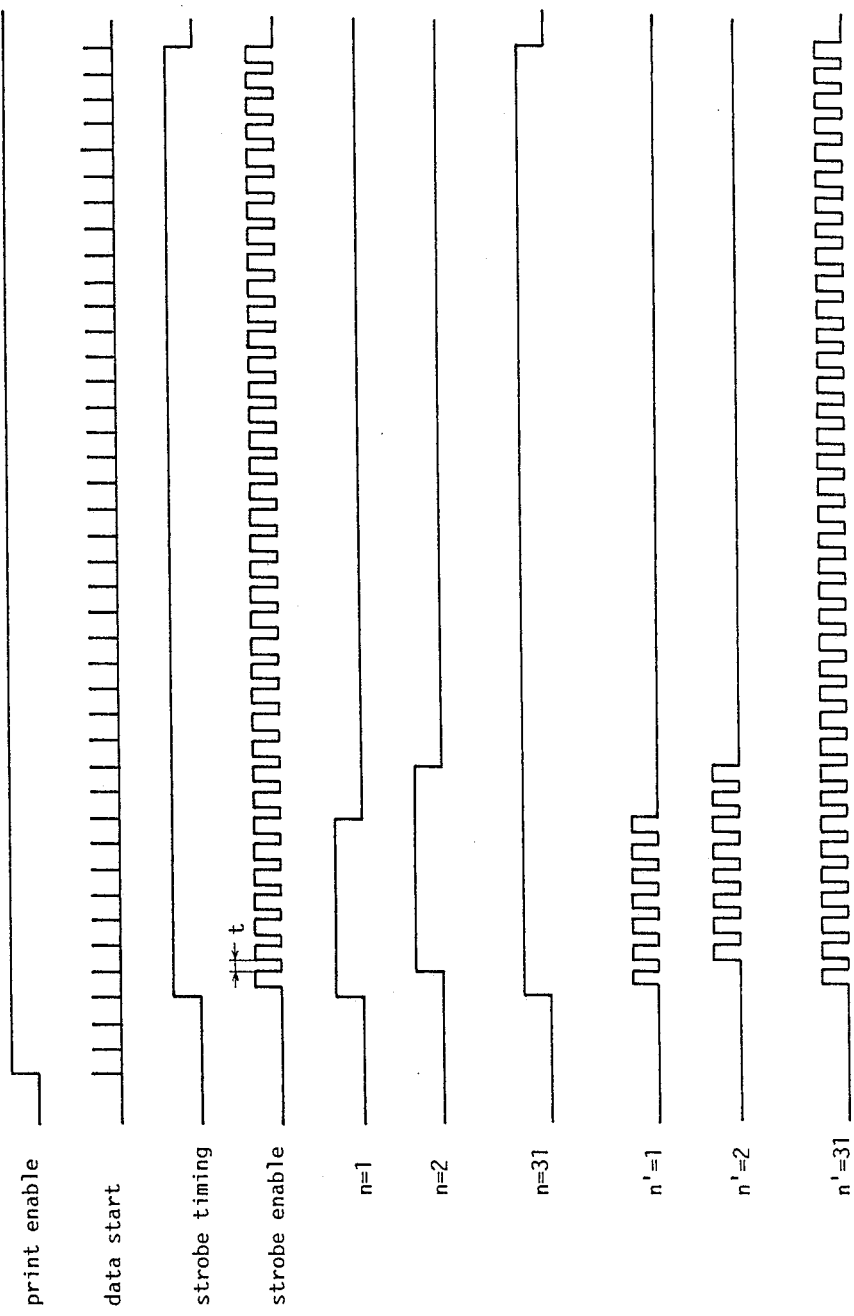

FIG. 14 shows the strobe timing signal and a strobe enable signal obtained by chopping the strobe timing signal at the AND circuit 59.

The strobe enable signal has a cut width t corresponding to a gate closing period at the AND circuit 59. This period is from a moment of data start signal generation to a point of time at which the head temperature information agrees with the count of the counter 56, and corresponds to the head temperature. The tone data n are applied to the heating element in synchronism with the strobe signals chopped as above. The tone data actually used for electrifying the heating element, as indicated by n' in FIG. 14, have waveforms chopped tone by tone with the predetermined time width t as does the strobe enable signal.

Figure 15:
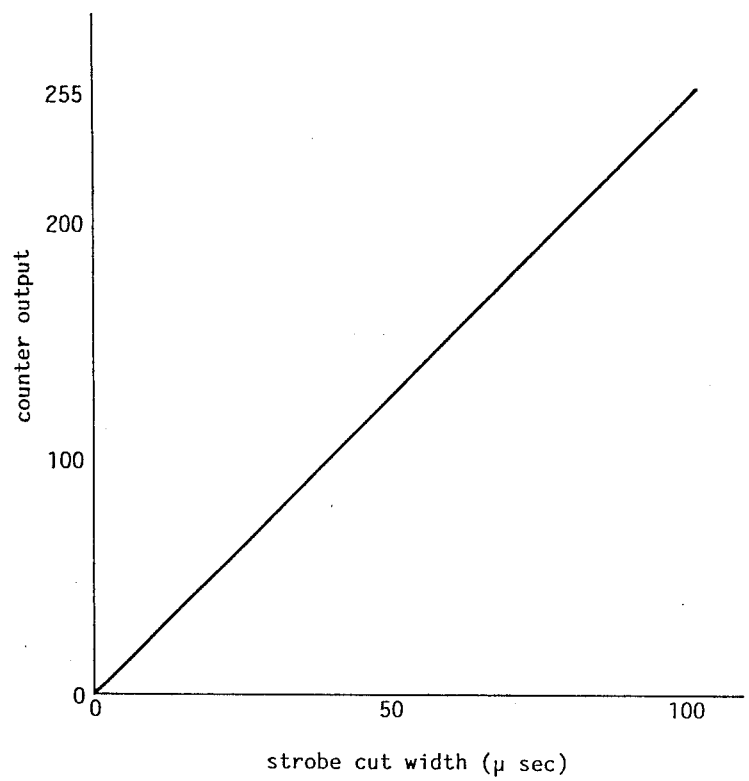
FIG. 15 is a view illustrating a relationship between a chopping width of the strobe signal and a counter output.

FIG. 15 shows a relationship between the counter output exceeding the head temperature and the cut width of the strobe signals.

The counter 56 comprises an up counter in the above embodiment, but it may of course comprise a down counter preset to a fixed value when the data start signal is applied, and thereafter decremented with every reference pulse applied thereto. In this case, the flip-flop 58 is set by the data start signal applied thereto, and is reset when the count of the down counter becomes smaller than the output of A/D converter 55. Then, the AND circuit 59 closes the gate during the period corresponding to the head temperature as in the above embodiment, to chop the strobe timing signal.

Instead of this embodiment which comprises the counter 56 and comparator 57, the invention may be practiced such that the digital value of the head temperature information per se is decremented by every reference pulse, and the gate of AND circuit 59 is closed until the value becomes zero.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A thermal transfer recording method for printing a multitone tone image by applying energy to a recording head in synchronism with a strobe signal for a period of time corresponding to digital tone data which represent the levels of tones as binary digits, comprising the steps of:

outputting a least significant digit of the digital tone data as a first signal;

outputting second signals repeatedly the number of times being equal to the digital tone data of binary form except the least significant digit data; and driving the recording head in response to said first and second signals so as to electrify the recording head for the unit time according to the first signal and for a period of twice as long as the unit time according to the second signal.

2. A thermal transfer recording method as claimed in claim 1, wherein said strobe signal is interrupted in correspondence with a temperature of the recording head each unit electrification time.

3. A thermal transfer multitone recording apparatus for printing a multiple tone image by applying energy to a recording head in synchronism with a strobe signal for a period of time corresponding to digital tone data which represent the levels of tones as binary digit, comprising:

means for generating a least significant digit of the digital tone data as a first signal;

means for generating second signals repeatedly the number of times being equal to the digital tone data of binary form except the least significant digit data;

means for driving the recording head in response to said first and second signals so as to electrify the recording head for the unit time according to the first signal and for a period of twice as long as the unit time according to the second signal.

4. A thermal transfer recording apparatus as claimed in claim 3, wherein said second signal generating means includes up counter means for outputting comparison data which is sequentially incremented and comparing means for sequentially comparing the digital tone data of binary form except the least significant digit data with said comparison data and outputting said second signal when said digital tone data except the least significant digit data exceed said comparison data.

5. A thermal transfer recording apparatus as claimed in claim 3, wherein said second signal generating means includes down counter means for outputting comparison data which is sequentially decremented from a preset value and comparing means for sequentially comparing the digital tone data of binary form except the least significant digit data with said comparison data and outputting said second signal when said digital tone data except the least significant digit data exceed said comparison data.

6. A thermal transfer recording apparatus as claimed in claim 3, wherein said second signal generating means comprises means for decrementing said digital tone data per se and outputting said second signal while the data are present.

7. A thermal transfer recording apparatus as claimed in claim 3, further comprising a circuit for applying the strobe signal to the recording head, said circuit including judging means for taking in temperature information from a temperature sensor for detecting a temperature of the recording head and for judging whether the electrification time has a proper duration or not, and chopping means for interrupting said strobe signal each unit electrification time with a time width based on results of the judgment.

8. A thermal transfer recording apparatus as claimed in claim 7, wherein said judging means includes an up counter for counting up reference pulses, a comparator for comparing the count of said counter with a digital value of the temperature information provided by said temperature sensor, and means for controlling said chopping means to interrupt the strobe signal in response to comparison results.

9. A thermal transfer recording apparatus as claimed in claim 7, wherein said judging means includes a down counter for counting down reference pulses from a preset value, a comparator for comparing the count of said counter with a digital value of the temperature information provided by said temperature sensor, and means for controlling said chopping means to interrupt the strobe signal in response to comparison results.

10. A thermal transfer recording apparatus as claimed in claim 7, wherein said judging means comprises means for decrementing the digital value of said temperature information received from said temperature sensor with each reference pulse, and controlling said chopping means to interrupt said strobe signal until said digital value becomes zero.

11. A thermal transfer recording apparatus as claimed in claim 7, wherein said chopping means comprises a gate circuit for interrupting said strobe signal.

12. A thermal transfer recording apparatus as claimed in claim 3, further comprising a temperature sensor for detecting a temperature of the recording head and for outputting temperature information to be used for varying a cycle of a timing signal to effect data transfer to the recording head by a predetermined number of tones.

* * * * *